US009424541B2

(12) United States Patent
Koul et al.

(10) Patent No.: US 9,424,541 B2
(45) Date of Patent: Aug. 23, 2016

(54) POLICY BASED USER CONTACTS LIST MANAGEMENT

(75) Inventors: Rohit Koul, Bangalore (IN); Gurudutta Ramanathaiah, Bangalore (IN); Deepak Ramakrishnan, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1320 days.

(21) Appl. No.: 12/492,114

(22) Filed: Jun. 25, 2009

(65) Prior Publication Data

US 2010/0332584 A1 Dec. 30, 2010

(51) Int. Cl.
*G06F 12/00* (2006.01)
*G06Q 10/06* (2012.01)
*G06Q 10/10* (2012.01)

(52) U.S. Cl.
CPC ............. *G06Q 10/06* (2013.01); *G06Q 10/10* (2013.01)

(58) Field of Classification Search
CPC .......... H04L 67/306; H04L 29/06047; H04L 67/14; H04L 67/20; G06Q 10/06; G06Q 10/10
USPC ................ 709/203, 220–222, 227, 228, 223, 709/204–207; 715/751–759
See application file for complete search history.

(56) References Cited

U.S. PATENT DOCUMENTS

| 6,247,043 | B1 * | 6/2001 | Bates et al. ................... 709/200 |
| 7,200,638 | B2 * | 4/2007 | Lake ..................... H04L 12/581 707/999.003 |
| 7,457,841 | B2 * | 11/2008 | Bordia .................. H04L 12/585 709/206 |
| 7,555,525 | B2 * | 6/2009 | Malik ................... H04L 12/581 709/205 |
| 7,593,925 | B2 * | 9/2009 | Cadiz et al. |
| 8,209,374 | B2 * | 6/2012 | Work ............................ 709/202 |
| 8,438,225 | B2 * | 5/2013 | Serr ....................... G06Q 10/00 709/204 |
| 8,751,582 | B1 * | 6/2014 | Behforooz ............ H04L 51/043 709/206 |
| 2005/0080859 | A1 * | 4/2005 | Lake ............................. 709/206 |
| 2005/0117715 | A1 * | 6/2005 | Bordia ....................... 379/88.13 |
| 2006/0227803 | A1 * | 10/2006 | Malik ........................... 370/461 |
| 2007/0288580 | A1 * | 12/2007 | Kaminsky et al. ........... 709/206 |

(Continued)

OTHER PUBLICATIONS

Chatterbox Instant Messenger, 'Do You Have Questions? We've got answers!' [online], [retrieved on Jan. 18, 2009]. Retrieved from the Internet: <URL: http://www.matchlink.com/static/faq/im_faq.do>.

(Continued)

*Primary Examiner* — Kenneth R Coulter
(74) *Attorney, Agent, or Firm* — Tucker Ellis LLP

(57) ABSTRACT

Embodiments of the present invention enable policy-based management of a user contacts list. Applications of the present invention are its use in embodiments of Instant Messaging (IM) systems. During an IM session, a session owner may temporarily add a contact to an active contacts list for a duration determined by evaluating constraints from one or more policies associated with the contact. At IM session initialization, a session owner's persistently stored contacts and their associated policies are retrieved, and the policies are evaluated. An active contacts list for use during the IM session is generated from a subset of stored contacts for which all associated policy constraints are satisfied. In embodiments, the active contacts list may be updated during a session by re-evaluating the stored contacts and associated policies. In embodiments, an active contacts list is updated after addition of a new contact determined to have an associated enabled policy satisfied.

20 Claims, 11 Drawing Sheets

(56) References Cited

U.S. PATENT DOCUMENTS

| | | | | |
|---|---|---|---|---|
| 2008/0205655 A1* | 8/2008 | Wilkins et al. | ................. | 380/279 |
| 2009/0150488 A1* | 6/2009 | Martin-Cocher et al. | .... | 709/204 |
| 2010/0030858 A1* | 2/2010 | Chasin | ......................... | 709/206 |
| 2010/0312836 A1* | 12/2010 | Serr | ...................... | G06Q 10/00 |
| | | | | 709/206 |

OTHER PUBLICATIONS

Lan Messenger LanTalk.NET online help, 'Contact List' [online], [retrieved on Jan. 18, 2009]. Retrieved from the Internet: <URL: http://www.lantalk.net/help/lantalk-net/contact-list.html>.

Yahoo Messenger Tutorials, 'Adding Contacts to Your Messenger List' [online], [retrieved on Jan. 18, 2009]. Retrieved from the Internet: <URL: http://help.yahoo.com/tutorials/ms75/mess/im_addcont1.html>.

TopBlogging Forum, 'MSN Errors—Solutions' [online], [retrieved on Jan. 18, 2009]. Retrieved from the Internet: <URL: http://www.topblogging.com/computers/sitedetails/773>.

Jessica Dolcourt, 'Yahoo set to answer your Messenger 9.0 questions', Oct. 3, 20083 [online] [retrieved on Jan. 18, 2009]. Retrieved from the Internet: <URL: http://www.download.cnet.com/8301-2007_4-10057665-12.html?tag=mncol;title>.

Learning Technologies, 'Exchange Instant Messenger—Installation and Quick Start Guide' [online], Feb. 19, 2003, [retrieved on Jan. 18, 2009]. Retrieved from the Internet: <URL: http://www.uakron.edu/its/learning/training/docs/Exchange_IM_instructions2.pdf>.

Thumbspeed, Inc., 'Rogers Instant Messaging—User Manual', May 24, 2005 [online] [retrieved on Jan. 18, 2009]. Retrieved from the Internet<URL: http://downloads.rogers.com/wireless/Rogers_User_Guide_EN.pdf>.

Dave Roos, 'How AOL Instant Messenger Works' [online] [retrieved on Jan. 18, 2009]. Retrieved from the Internet<URL: http://communication.howstuffworks.com/aol-instant-messenger.htm/printable>.

Brandon De Hoyos, 'How to Add Contacts to Digsby' [online] [retrieved on Jan. 18, 2009]. Retrieved from the Internet<URL: http://im.about.com/od/imfornewusers/a/digsbyfriends.htm>.

* cited by examiner

POLICY BASED USER CONTACTS LIST MANAGEMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

A. Technical Field

The present invention pertains generally to data processing, and relates more particularly to user contacts list management.

B. Background of the Invention

A user contacts list is a common feature provided to users of a wide variety of electronic communication systems such as email systems, instant messaging (IM) systems, mobile telephones, and online gaming systems. A user contacts list is a list of screen names representing the set of people with whom a particular user communicates via the system. Each screen name on the list is associated with an electronic address by which the person having that screen name can be located within the electronic communication system network. A typical use for a contacts list is to provide quick and efficient connectivity between the owner of the contacts list and any contact that the owner selects from the list. For example, a cell phone user may bring up and dial the telephone number of a contact by selecting the contact's screen name from a contacts list displayed on the cell phone.

It is common for a contacts list to store additional information for each contact; the types of additional information may be specific to the kind of electronic communication system providing the contacts list feature. For example, an email system "address book" contacts list may include a contact's business and residence telephone numbers and addresses in addition to the contact's email addresses. In some systems, personal data about a contact may be stored in the contacts list, such as the contact's preferences or affiliations.

Because each contacts list may grow over time to include a large number of entries, most electronic communication systems also provide support for contacts list management and persistent storage. Contacts list management may include methods that facilitate the addition and removal of contacts and their associated data, as well as methods for organizing the contacts in a list. A contacts list owner often may create special purpose contacts lists from subsets of the contacts to facilitate context-dependent communication sessions among groups of interested users.

Since the typical electronic communication system user accesses the system via a client platform that has limited computing and storage resources (such as a cell phone, PDA, or gaming console), it is important for the electronic communication system to provide hosted centralized support for contacts list management and persistent storage. This insures that an electronic communications system user will be able to access contacts quickly and efficiently from whatever client device is being used.

SUMMARY OF THE INVENTION

Embodiments of the present invention enable policy-based management of a user contacts list. Applications of the present invention are its use in embodiments of Instant Messaging (IM) systems. During an IM session, a session owner may temporarily add a contact to an active contacts list for a duration determined by evaluating constraints from one or more policies associated with the contact. At IM session initialization, a session owner's persistently stored contacts and their associated policies are retrieved, and the policies are evaluated. An active contacts list for use during the IM session is generated from a subset of stored contacts for which all associated policy constraints are satisfied. In embodiments, the active contacts list may be updated during a session by re-evaluating the stored contacts and associated policies. In embodiments, an active contacts list is updated after addition of a new contact determined to have an associated enabled policy satisfied.

In embodiments, a system for generating an active user contacts list for a user of an electronic communication system may comprise a messaging server, operating on a first computer system, the messaging server generating the active user contacts list for an electronic communication system session in response to a client request received from a messaging client. In embodiments, the messaging server comprises an active contacts list generator, coupled to a persistent data store, that retrieves a set of user contacts from a persistent user contact data store and a set of policies from a persistent policy data store; evaluates the set of policies to identify which policies are satisfied; and, if a policy is satisfied, adds a user contact from the set of user contacts that is associated with the satisfied policy to the active user contacts list. In embodiments, a policy associated with a user contact is configurable.

In embodiments, the active contacts list generator may comprise a policy evaluator, coupled to receive a policy from the set of policies, the policy evaluator evaluating the policy by retrieving evaluation data and using the retrieved evaluation data to determine whether the policy is satisfied. In embodiments, the policy is associated with at least one external data source, and the evaluation data is retrieved from an external data source. In embodiments, the policy is associated with a set of logical constraints.

In embodiments, the system for generating an active user contacts list may further comprise a messaging client, operating on a second computer system, the messaging client submitting the client request to the messaging server and receiving the active user contacts from the messaging server in response to the client request. In embodiments, the messaging client may comprise a user interface that receives input from the user and displays session information data to the user; and a client local data store that stores session information data comprising the active user contacts list. In embodiments, session information data may comprise a set of policies associated with the active user contacts list.

In embodiments, the messaging client may further comprise a second policy evaluator, coupled to receive a policy from the set of policies associated with the active user contacts list, the second policy evaluator evaluating the policy by retrieving evaluation data and using the retrieved evaluation data to determine whether the policy is satisfied. In embodiments, the policy is associated with at least one external data source and the evaluation data is retrieved from the external data source.

In embodiments, the messaging client may further comprise a polling agent that receives a polling request and submits the client request in response to the polling request. In embodiments, the user interface provides a visual display of an updated active user contacts list on the second computer system.

In embodiments, a computer program product to add a contact to an active user contacts list during an instant messaging (IM) session may perform the steps comprising receiving an "add contact" request from the IM session owner, the "add contact" request specifying a new contact comprising a contact identifier and a policy associated with the new contact; adding the new contact to a set of user contacts associated with the IM session owner and that are stored in a persistent user contact data store; adding the policy to a set of policies that are associated with the stored set of user contacts and that are stored in a persistent policy data store; evaluating the policy to determine whether the policy is satisfied; and if the policy is satisfied, updating the active user contacts list during the IM session by generating an updated active user contacts list that includes the new contact; storing the updated active user contacts list in a client local data store associated with the IM session owner; and displaying the updated active user contacts list to the IM session owner by a user interface.

In embodiments, generating the updated user contacts list that includes the new contact may comprise retrieving the updated set of user contacts from the persistent user contact data store and the updated set of policies from the persistent policy data store; evaluating the updated set of policies to identify which policies are satisfied; and responsive to a policy being satisfied, adding the user contact associated with the satisfied policy to the updated user contacts list. In embodiments, a policy associated with a user contact is configurable. In embodiments, evaluating a policy may comprise retrieving evaluation data to determine whether the policy is satisfied. In embodiments, the policy is associated with at least one external data source, and the evaluation data is retrieved from the external data source.

In embodiments, a method for generating an active user contacts list for a user of an electronic communication system may comprise retrieving a set of user contacts that are associated from a persistent user contact data store and a set of policies associated with the set of user contacts from a persistent policy data store; evaluating the set of policies to identify which policies are satisfied; and responsive to a policy being satisfied, adding the user contact associated with the satisfied policy to the active user contacts list.

In embodiments, a policy associated with a user contact is configurable. In embodiments, evaluating a policy from the set of policies may comprise retrieving evaluation data and using the retrieved evaluation data to determine whether the policy is satisfied. In embodiments, the policy is associated with at least one external data source, and the evaluation data is retrieved from the external data source.

Some features and advantages of the invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Figure 1:
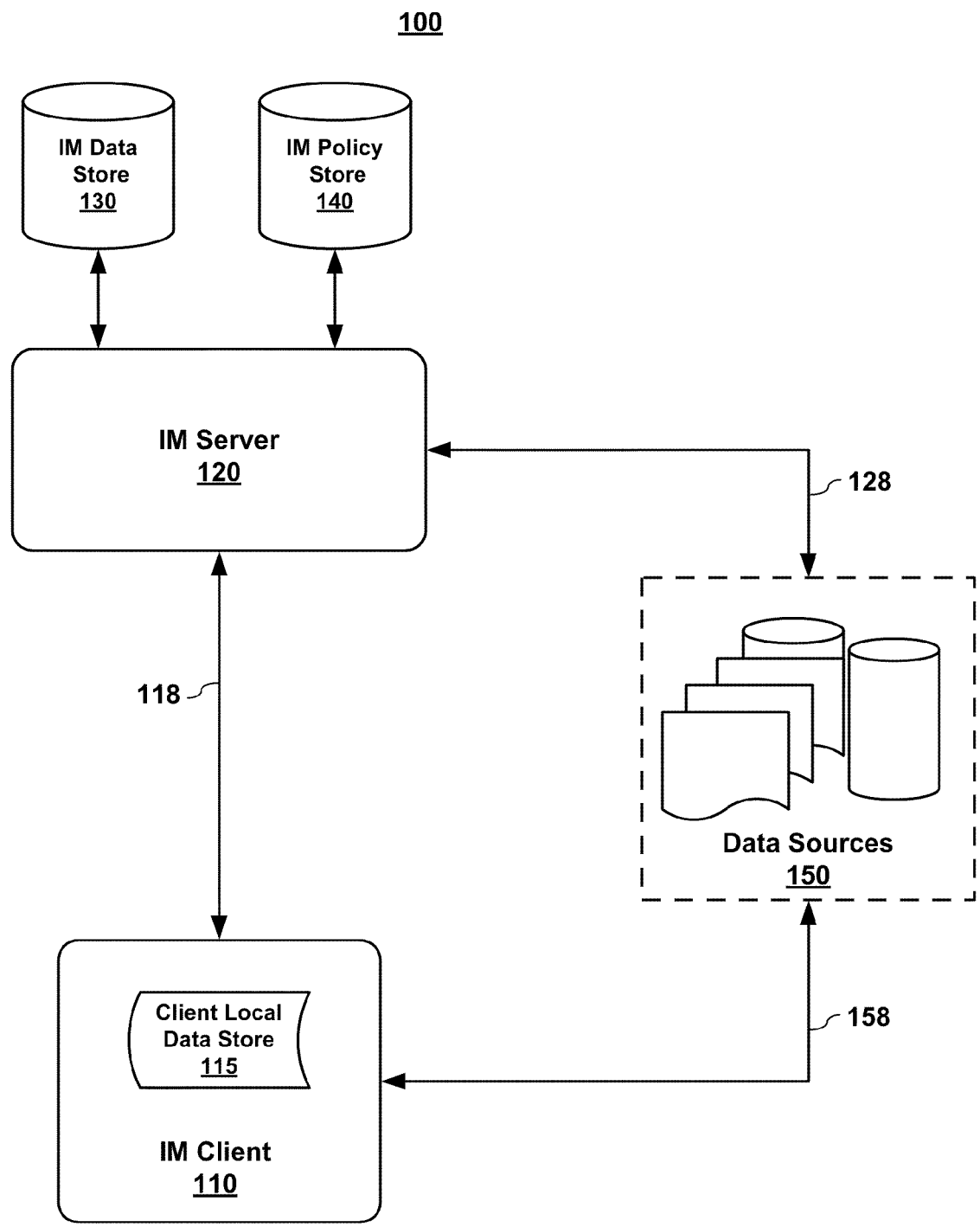
FIG. 1 depicts a block diagram of a system for policy-based management of an instant messaging (IM) system contacts list according to various embodiments of the invention.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, including software, hardware, or firmware, or combinations thereof. Accordingly, the figures described herein are illustrative of specific embodiments of the invention and are meant to avoid obscuring the invention.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component.

Furthermore, connections between components within the figures are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. The appearances of the phrases "in one embodiment," "in an embodiment," or "in embodiments" in various places in the specification are not necessarily all referring to the same embodiment or embodiments.

The use of certain terms in various places in the specification is for illustration and should not be construed as limiting. Usage of the term "service" is not limited to describing a single function; usage of the term also may refer to a grouping of related functions or functionality. Similarly, usage of the term "resource" is not limited to describing a single resource; the term also may be used to refer to a set of resources that may either be distributed or aggregated within a computing environment.

A. Overview

One specific application of the present invention is its use in embodiments of instant messaging (IM) systems. These embodiments will be described for illustrative purposes and not for limitation. One skilled in the art shall recognize the general applicability of the present invention.

Instant messaging (IM) technologies enable two or more participants to exchange text messages in real time over a network, such as a corporate intranet or the Internet. Instant messaging is provided to users via a distributed IM application, which enables a user to send messages to other IM users by interacting with a user interface provided by an IM client executing on a local computing device. A typical IM application provides features in addition to messaging support, such as file transfer, support for "friends networks" of associated participants, and storage and management of contacts lists. In order to facilitate communication and collaboration among business colleagues within a business enterprise, an IM application may be further integrated into business applications, such as workflow and customer relationship management (CRM) applications.

In a typical usage scenario, an IM user (session owner) initiates an IM session by logging into an instance of a local IM client. The local IM client may provide a display of the session owner's active contacts list (known as a "buddy list" in various IM applications), which shows the screen names of other IM users that are known to the session owner. By selecting a contact's screen name from the buddy list, a session owner submits a request to the IM application to establish a connection with the contact (and display the session owner's screen name on the contact's IM client) so that the session owner and the contact can exchange messages during the IM session. Being able to use a buddy list enhances ease of use of an IM application, because a session owner is not required to know and explicitly enter the network addresses of all of the other participants who might be available for message exchange.

Management and persistent storage of a session owner's buddy list may be resource intensive, and this may prove difficult to support solely on a local IM client that is executing on a platform having limited resources (e.g., a cell phone or personal digital assistant (PDA)). To optimize resources, an IM client may initialize and then cache a session owner's active buddy list at IM session startup. The initialized active buddy list may be generated from a set of contacts that has been retrieved from persistent storage, such as a database, that is deployed on another network node. During the IM session, the session owner interacts with the locally cached active buddy list so that the session owner's IM client user experience has optimum performance. The cached active buddy list may be periodically synchronized with the persistently stored set of contacts during the IM session.

If the session owner "pings" (establishes a connection to) a new contact who is not on the active buddy list, the new contact typically is added by the IM application to the session owner's cached active buddy list. The new contact thus is a temporary contact, because that contact will remain on the active buddy list only for the duration of the current IM session. In one typical scenario, a new contact can be made a permanent contact (i.e., be added to the set of persistently stored contacts) if the new contact accepts a "friend request" sent by the session owner. Permanent contacts are persistently stored until they are explicitly deleted by the session owner.

In various IM application embodiments, a temporary contact may be persistently stored for a period of time (e.g., a duration ended by an expiration date) which can be designated by either the IM system or the contact list owner. However, traditional IM applications do not provide support for a policy-based designation of a temporary contact who will be added to an active contacts list based on satisfaction of one or more non-temporal constraints. For example, a company HR session owner may wish to have a contact added to an active employment candidate contacts list while the contact's hiring offer approval is pending. Using a traditional system, the HR session owner would have to explicitly remove the contact from the active contacts list after determining that the hiring offer is either made or rescinded. Explicit management of such an active employment candidate contacts list becomes time consuming, especially for complex scenarios such as a contact who may receive multiple hiring offers or a contact who may have one hiring offer be rescinded and then be replaced with a second hiring offer. In these types of scenarios, policy-based designation of a contact would enable the system to automatically add and delete the contact from the active employment candidate contacts list based on the state of the contact's pending hiring offers. Policy-based contacts list management mitigates the traditional system end-user inconvenience and cluttered contacts list entries in the IM client buddy list display that result from requiring the end user to explicitly manage the contents of the active contacts list.

In embodiments of the present invention, a contact being added to a contacts list may be associated with a set of constraints associated with one or more policies, enabling such a contact to remain on the contacts list as long as the set of constraints are satisfied. In embodiments, a constraint may be a non-temporal constraint associated with one or more external resources. This policy-based management of a contacts list is performed by the system, eliminating the need for explicit contacts management by a session owner.

B. System Implementations

FIG. 1 depicts a block diagram of a system 100 for policy-based management of an instant messaging (IM) contacts list according to various embodiments of the invention. The components of system 100 may be deployed across a client/server application platform, although those skilled in the art will recognize that many types of application platform exist and that the application platform deployment choice is not critical to the invention.

In embodiments, a user may interact with the system 100 via a user interface provided by an IM client 110. In embodiments, the IM client 110 may execute on a computing device such as a personal computer or a consumer electronic device (e.g., a mobile phone, a personal digital assistant (PDA), and a television set top box) that is local to the user. In various embodiments, the IM client 110 may be implemented as a plugin that is associated with an internet browser application executing on a local computing device. Those skilled in the art will recognize that a variety of client implementation choices exist, and that the client implementation choice is not critical to the invention.

In embodiments, a client 110 may comprise a client local data store 115, in which a local representation of user-associated IM session information is stored. In embodiments, data representing user-associated IM session information comprise a user contacts list and a set of policies used to manage the contacts list. In embodiments, a user contact includes the specification of its associated policies. In various embodiments, user-associated IM session information may be represented as a set of XML documents, although those skilled in the art will recognize that a variety of data representational schemes exist and that the data representation scheme choice is not critical to the invention. In embodiments, user-associated IM session information may be cached in the client local data store 115 for the duration of an IM session, while in other embodiments, the client local data store 115 may be a persistent data store, such as a database, so that storage of the user-associated IM session information persists beyond the duration of an IM session. Those skilled in the art will recognize that the choice of client local data store 115 implementation is not critical to the invention.

In embodiments of system 100, an IM server 120 may be deployed on a host computer platform. In embodiments, an IM client 110 and an IM server 120 may communicate via a network connection 118 between the host computer platform and the local computing device on which the IM client 110 executes. In embodiments, persistent data storage for system-wide data may be accessed directly by the IM server 120. In various embodiments, persistent data storage for system-wide data comprises an IM data store 130 and an IM policy store 140. In embodiments, an IM data store 130 may comprise a user repository in which the contacts of all of the IM system users are stored. In embodiments, an IM policy store 140 is a data repository comprising the set of policies used to manage user contacts lists. In embodiments, exemplary IM system-wide data store implementations may be one or more of: a database, an LDAP-based directory server, and a set of flat files, although the choice of a type of IM system-wide data store implementation is not critical to the invention. In various embodiments, at least some of the IM system data may be represented as a set of XML documents, although those skilled in the art will recognize that a variety of data representational schemes exist and that the data representation scheme choice is not critical to the invention.

In various embodiments, the stored set of policies used to manage user contacts lists may comprise one or more types of policies. For example, in embodiments, there may be a set of system and user policies, as summarized in Table 1, stored within an IM policy store 140. A system policy has a global scope, meaning that it is associated with all users stored in the IM system data store 130. For example, an "add Manager" global policy for a corporate IM system would automatically add an employee's direct manager to the employee's active contacts list each time the employee initiates an IM session. In embodiments, a system policy may be pre-configured (e.g., have an "out of the box" configuration supplied with the IM system configuration), or a system policy may have a custom configuration that is defined by a system installation administrator for a particular system installation. In embodiments, a user policy has a configuration defined by a contacts list owner, and the user policy has a local scope that applies only to contacts within the owner's contacts list.

TABLE 1

Exemplary Policy Types

| Policy Type | Configuration | Scope |
|---|---|---|
| System | Pre-Configured | Global |
|  | Admin-Configured | Global |
| User | User-Defined | Local |

In embodiments, a policy may comprise a set of one or more constraints (logical predicates) that are evaluated when a user contacts list is generated from a set of contacts selected from the IM system data store 130. In embodiments, a constraint may be a temporal constraint (e.g., the constraint evaluates to true for a designated time period) or a non-temporal constraint (e.g., a constraint associated with a resource other than time). In embodiments, a policy may comprise a set of constraints containing temporal constraints, non-temporal constraints, or both.

In embodiments, a set of constraints may be associated into a constraint chain, within which the constraints are linked by logical operators such as AND, OR, and NOT. The result of evaluating a constraint chain is determined by evaluating each of the constraints within the chain, and then applying the linking logical operators to the evaluation results. For example, a two-constraint chain (C1 AND C2) would evaluate to true if both C1 and C2 evaluate to true, and the constraint chain would evaluate to false if at least one of the constraints evaluates to false.

In embodiments, the evaluation of a constraint may require accessing data located in one or more external data sources 150. Examples of external data sources include repositories (e.g., databases, LDAP-based directory servers, stored flat files) and exposed application programming interfaces (APIs) (e.g., public application interfaces and web service interfaces). In embodiments of system 100, constraint evaluation may be implemented on the IM server 120 and/or on the IM client 110, both of which may communicate with the external data sources 150 via a network connection (128 and 158).

1. System for Initializing and Maintaining an Active User Contacts List

Figure 2:
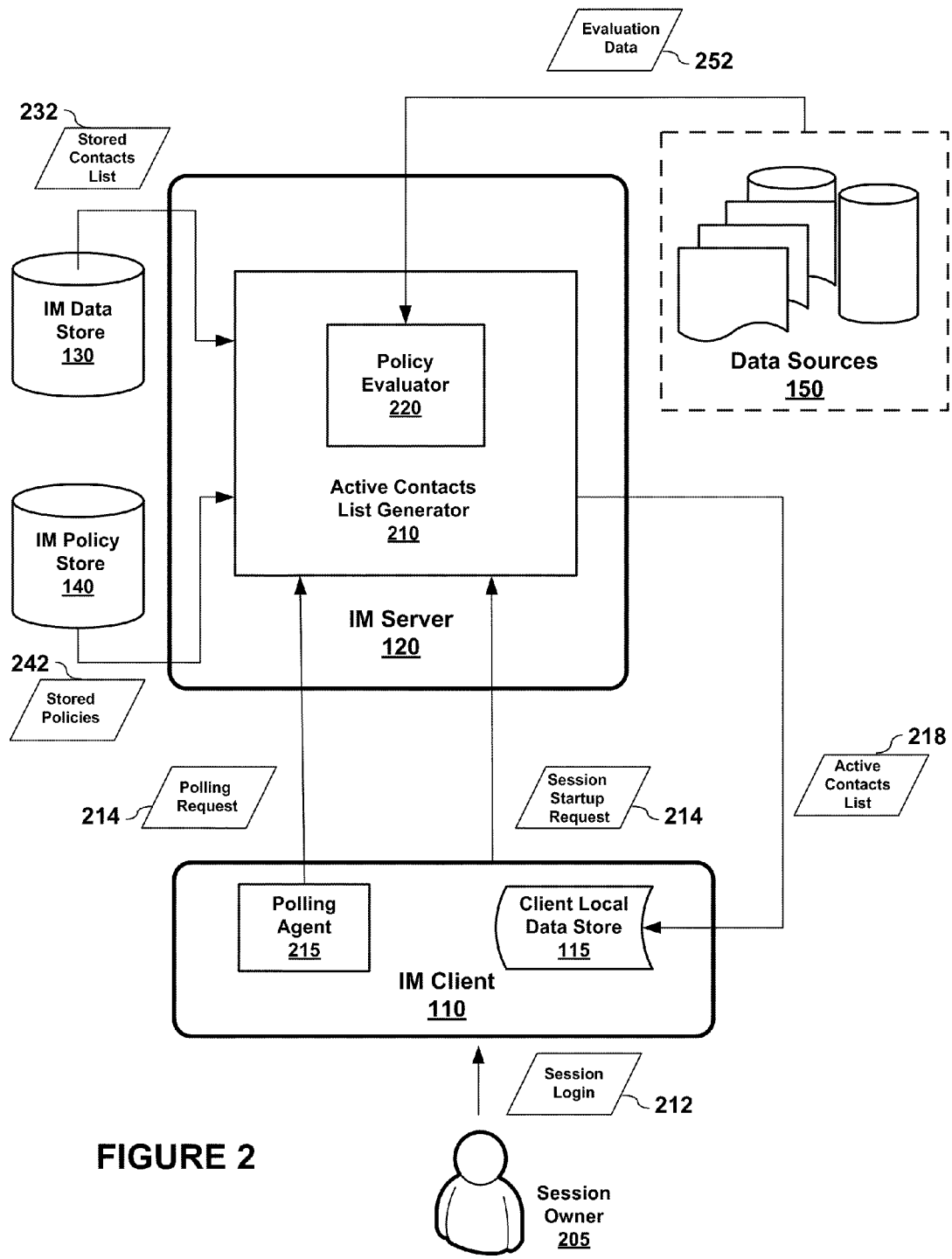
FIG. 2 depicts an exemplary scenario for initializing and maintaining a user contacts list during an IM client session according to various embodiments of the invention.

FIG. 2 illustrates an exemplary scenario for initializing and maintaining an active user contacts list during an IM client session according to various embodiments of system 100. In embodiments, a session owner 205 initiates an IM session by submitting a session login 212 to the IM client 110. In various embodiments, as part of initialization of a client session instance, the IM client 110 may initialize an instance of the session owner's 205 contacts list from the user-associated IM session information that is cached in the client local data store 115. In various embodiments, after receiving a session login 212 from a session owner 205, the IM client 110 submits a session startup request 214 to an IM server 120, which will generate a policy-based active contacts list 218 for the session owner 205.

In embodiments, an IM server 120 comprises an active contacts list generator 210. Based in part on an identifier associated with the session owner 205, active contacts list generator 210 retrieves a stored set of contacts 232 from the IM system data store 130 as well as a stored set of policies 242 from the IM system policy store 140. As previously discussed and summarized in Table 1, the stored set of policies 242 may comprise pre-configured system policies, admin-configured system policies, and/or user policies that have been defined and configured by the session owner 205.

In embodiments, active contacts list generator 210 associates a selected set of the contacts in the retrieved stored contacts list 232 with at least a subset of the retrieved set of stored policies 242. In embodiments, the constraints associated with the retrieved set of stored policies 242 are evaluated. In various embodiments, active contacts list generator 210 comprises a policy evaluator 220 that evaluates the set of constraints associated with a policy. As previously described, evaluation of a policy constraint may require evaluation data 252 to be retrieved from at least one external data source 150. For example, three retrieved contacts (A, B, and C) may be software developers who are collaborating with a session owner on resolving a defect (bug) that has been logged into a defect tracking system (i.e., a bug tracking system). The session owner may wish to have A, B, and C displayed on his/her active contacts list as long as the bug is open. Therefore, the three retrieved contacts may be associated with a policy containing a constraint associated with the bug (such as "The status of Bug 12345 equals 'Open'") and constraint evaluation requires retrieving the current bug status 252 from the associated external resource 150, the bug tracking system.

In embodiments, active contacts list generator 210 generates an active contacts list 218 that comprises contacts from the retrieved stored contacts list 232 that are associated with a subset of retrieved stored policies 242 for which the constraints have been satisfied after evaluation by the policy evaluator 220. A contact from the retrieved stored contacts list 232 is added to the generated active contacts list 218 if it is associated with at least one of the retrieved stored policies 242 for which all of the constraints are satisfied. Turning to the example, the contacts A, B, and C would be added to the active contacts list 218 as long as the status of Bug 12345 remains "Open," but would not be added to the active contacts list 218 if the status of Bug 12345 changes (e.g., Bug 12345 status changes from "Open" to "Resolved"). The contacts A, B, and C again would be added to the active contacts list 218 if the status of Bug 12345 were to change back to "Open" (e.g., the bug is re-opened). In various embodiments of system 100, policy evaluator 220 also may be implemented within embodiments of IM client 110, enabling client-side policy evaluation. In various embodiments, a generated active contacts list 218 may further comprise a subset of the retrieved stored contacts list 232 composed of contacts that are not associated with the retrieved stored policies 242.

In embodiments, a generated active contacts list 218 may be received by IM client 110 for caching in a client local data store 115 during processing of an IM session startup request 214. In various embodiments in which an initialized session owner's contacts list had been generated by IM client 110 based on persistently cached user-associated IM session information from the client local data store 115, the initialized contacts list may be purged and then replaced by the received active contacts list 218.

a) Polling Agent

In embodiments of the invention, the active contact list that is cached in the client local data store 115 may need updating during an IM session because the policy evaluation results used to generate the active contact list 218 may change. In various embodiments, a policy stored within the IM system policy store 140 may be considered to be a dynamic policy, for which the evaluation of its constraints at a subsequent time may return a different result. Policies having constraints depending on values of evaluation data 252 retrieved from external data sources 150 typically are dynamic policies, since the values of the retrieved evaluation data 252 may change over time. The exemplary policy associated with the constraint "The status of Bug 12345 equals 'Open'" also is an exemplary dynamic policy, since a bug's status within a defect tracking system is expected to change over time.

In embodiments, a stored policy within the IM policy store 140 may be configured to be "enabled" (i.e., its constraints are to be evaluated) or to be "disabled" (i.e., its constraints are not to be evaluated). For example, in embodiments, all pre-configured system policies and newly created system and user policies may have a default configuration of enabled. In embodiments, an IM system may support an auto-disabling feature in which a policy's enablement status is dependent on the satisfaction of temporal constraints (e.g., the policy becomes disabled after two weeks) and/or non-temporal constraints (e.g., the policy becomes disabled after addition of a particular contact or group of contacts to the IM data store). In various embodiments, only the subset of enabled retrieved stored policies 242 may be associated with contacts from the retrieved stored contacts list 232. In embodiments, the composition of the active contacts list 218 generated at different points in time during a single IM session may vary because the subset of enabled retrieved stored policies 242 used to select the contacts to be added to the active contacts list 218 may vary. Thus, it may be important to update the cached active contacts list in the client local data store 115 during an IM session so that the session owner 205 may continue to have access to the most currently relevant set of active contacts.

In embodiments of system 100, various embodiments of IM client 110 may further comprise a polling agent 215 to facilitate dynamic updating of the cached active contacts list in the client local data store 115 during an IM session. In embodiments, polling agent 215 submits a polling request 214 to active contacts list generator 210, which handles the polling request 214. In various embodiments of IM client 110, the polling request 214 may be generated and submitted in response to a request submitted to the IM client 110 by the session owner 205, and/or it may be one of a set of polling requests 214 that are generated and submitted by the IM client 110 at regular time intervals during an IM session based on a time interval value that is configurable by the session owner 205.

In embodiments, active contacts list generator 210 handles a submitted polling request 214 by generating an active contacts list 218 and returning the generated active contacts list 218 to the IM client 110 according to the same process that was previously described for IM session initialization. The cached active contacts list that is within the client local data store 115 is updated to represent the received generated active contacts list 218, so that it will reflect the evaluation results of the most current set of enabled policies that have been applied to the most current set of active contacts available within the IM system 100.

2. System for Addition of a Contact to a Contacts List

Figure 3:
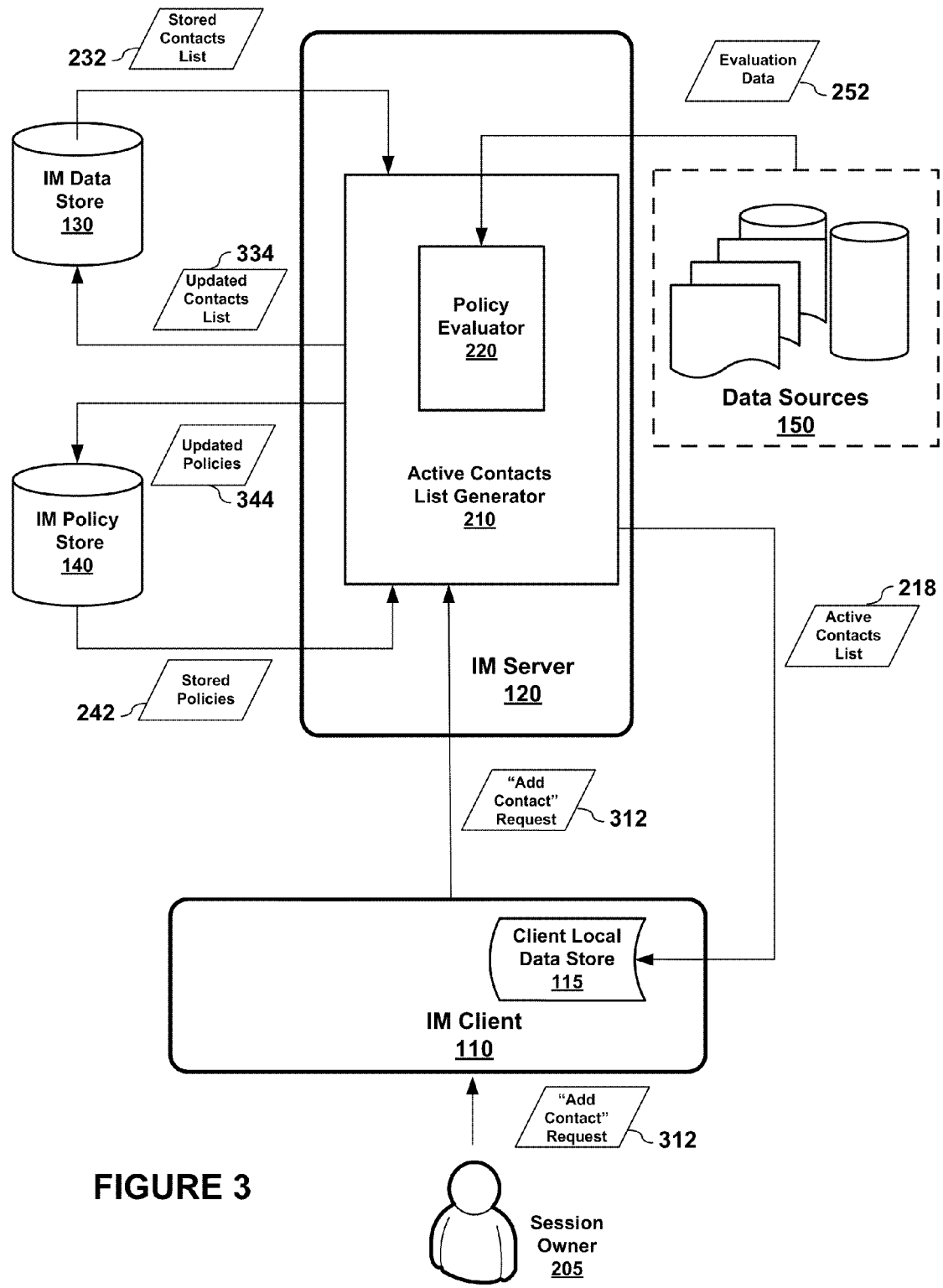
FIG. 3 depicts an exemplary scenario for policy-based addition of a contact to a contacts list during an IM client session according to various embodiments of the invention.

FIG. 3 illustrates an exemplary scenario for addition of a contact to a contacts list during an IM client session according to various embodiments of system 100. In embodiments, a session owner 205 initiates addition of a contact by submitting an "add contact" request 312 via a user interface provided by an IM client 110. In various embodiments, an "add contact" request 312 comprises an identifier of a new contact and may further comprise a policy that is associated with the new contact.

In embodiments, active contacts list generator 210 receives an "add contact" request 312 comprising a new contact identifier and an associated policy. In embodiments, the new contact entry is added to the retrieved stored contacts list 232, and the policy is added to the retrieved stored policies 242 if the policy has not previously been stored.

In embodiments, the policy constraints of the updated policies 344 are evaluated by a policy evaluator 220, and active contacts list generator 210 generates an updated active contacts list 218 comprising a subset of contacts from the updated contacts list 334 that is associated with a subset of the updated policies 344 having all constraints satisfied, as previously described for IM session initialization. If all of the policy constraints associated with the new contact are satisfied, the updated active contacts list 218 includes the new contact. In alternate embodiments, an updated active contacts list 218 may be generated by incrementally adding the new contact to a cached active contacts list if all of the associated policy constraints are satisfied. The updated active contacts list 218 is received by the IM client 110. The active contacts list that is cached in the client local data store 115 is replaced by the received active contacts list 218 that contains the newly added contact. In embodiments, the IM client 110 is updated to display the currently cached active contacts list.

Figure 4A:
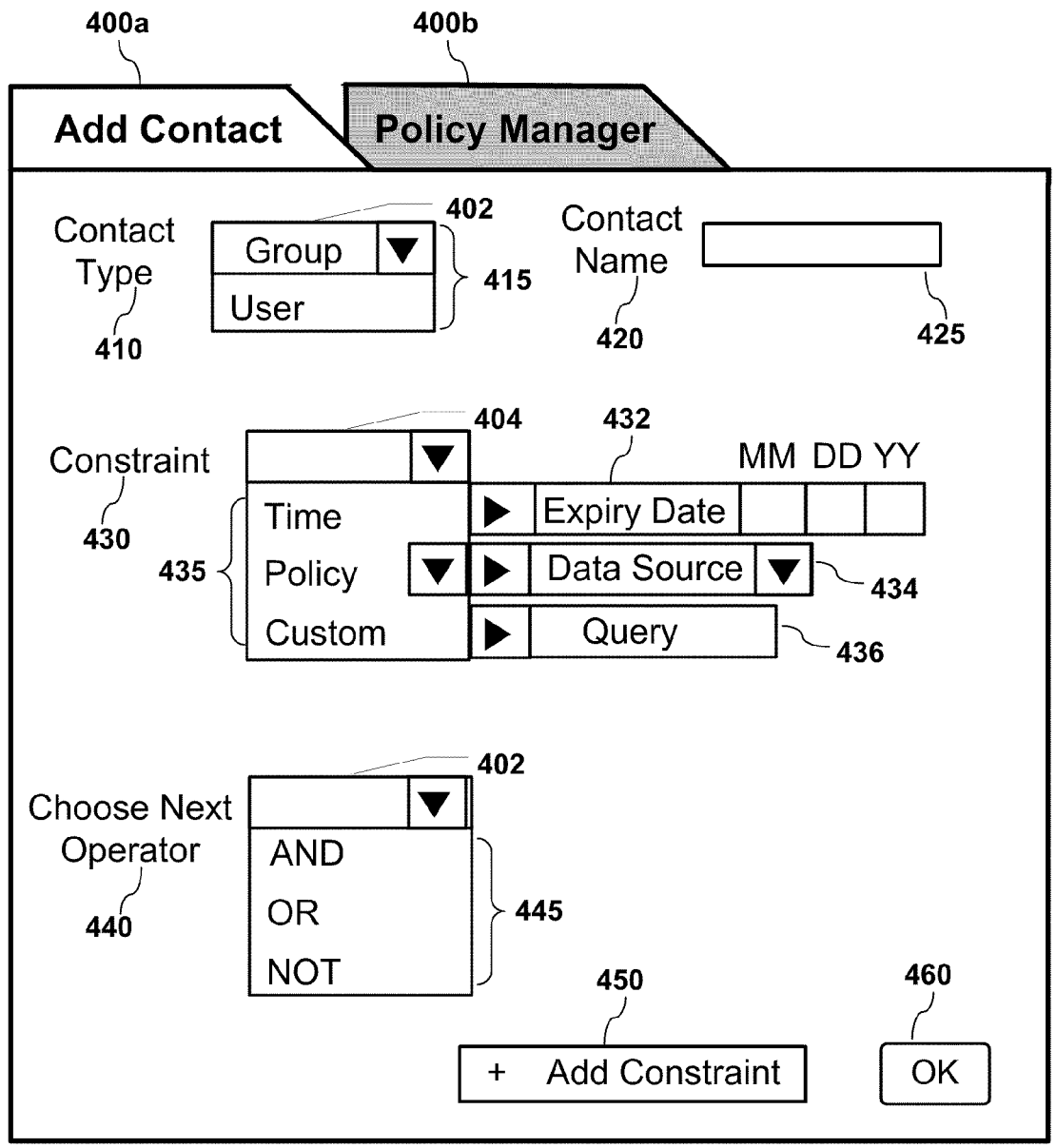
FIG. 4A depicts an exemplary graphical user interface GUI view for defining an "add contact" request according to various embodiments of the invention.
Figure 4B:
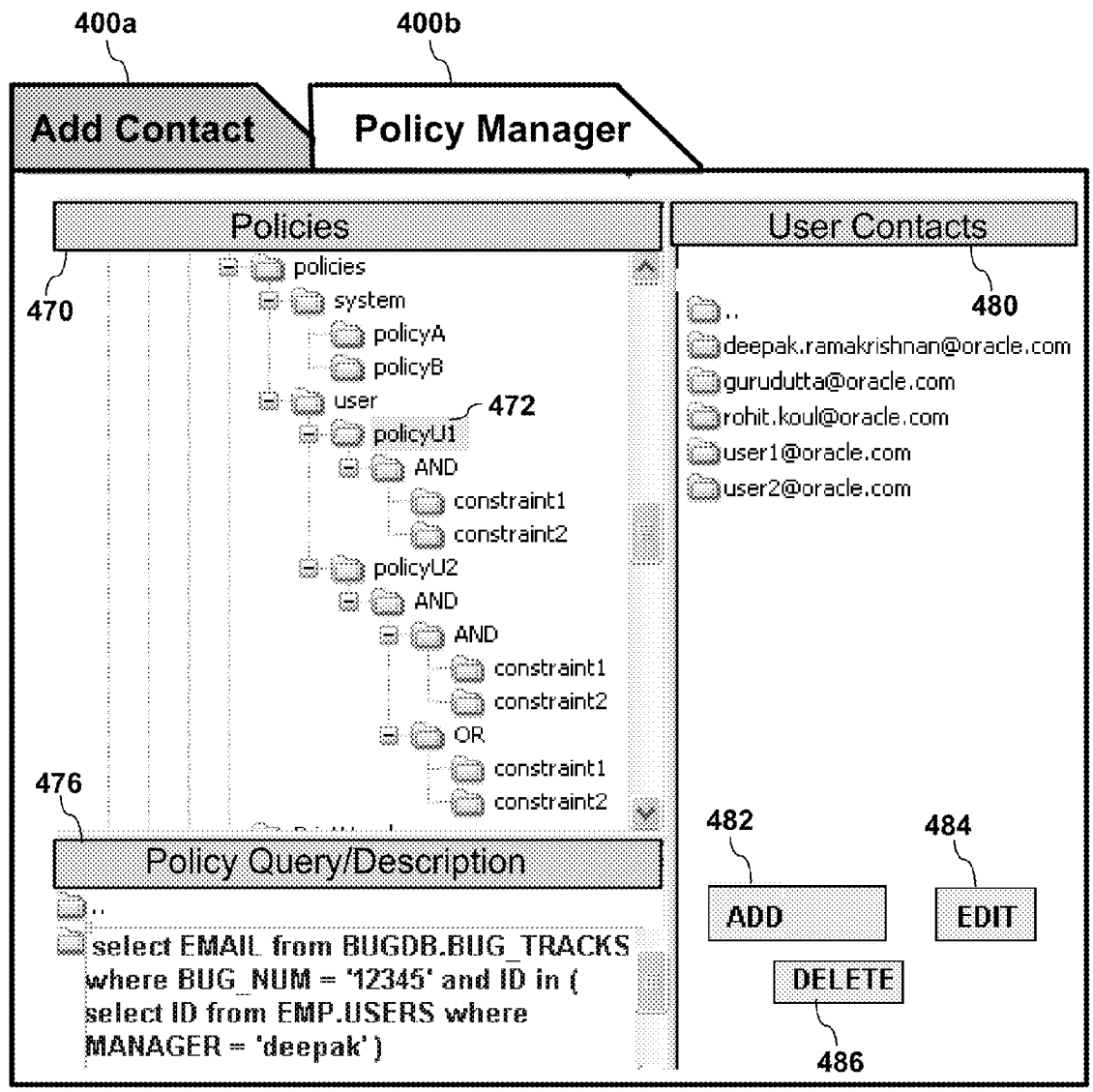
FIG. 4B depicts an exemplary graphical user interface GUI view for policy management according to various embodiments of the invention.

FIGS. 4A and 4B depict two views of an exemplary graphical user interface (GUI) that is provided by an embodiment of an IM client 110 for adding a new contact and for managing policies associated with a contacts list according to various embodiments of the invention. This exemplary GUI, in which each view is accessed by selecting a tab, is presented for purposes of illustration and not for limitation. Those skilled in the art will recognize that each view may be implemented as a separate GUI, or in combination with other views, and that a GUI design choice is not critical to the invention.

FIG. 4A depicts an exemplary GUI 400a for defining an "add contact" request 312 according to various embodiments of the invention. In embodiments of IM system 100, this GUI may be a tab view selected by a session owner 205.

In embodiments, a session owner 205 may define an "add contact" request 312 for addition of either an individual contact ("user") or a group of contacts ("group") by selecting a required choice 415 from a "contact type" 410 list box 402. The session owner 205 also is required to enter a text identifier ("contact name" 420) that is associated with the contact into a text box 425.

In embodiments, an "add contact" request 312 may further comprise a policy to be associated with the new contact. A session owner 205 may specify the policy via the GUI 400a by specifying one or more of its constraints from choices 435 of constraint types that are presented in a "constraint" 430 context menu 404. In embodiments, exemplary constraint type choices may include: 1) Time (temporal) constraint (with context-associated specification of a timeframe such as entering an expiration date 432); 2) Policy (non-temporal) constraint, which may be presented in a combo box enabling selection of a previously defined policy constraint or entry of a new policy constraint (with, if applicable to the selected policy constraint, a context-associated data source combo box 434 enabling selection at least one associated data source from previously defined data sources or entry of a new associated data source); and 3) Custom (user-defined) constraint (with a context-associated list box enabling specification 436 of a query to be associated with the constraint). In embodiments, a data source 434 may have pre-defined constraints from which to choose, but a user may select Custom and define a custom constraint query instead. An exemplary query is depicted in the Policy Query/Description pane 476 of the exemplary policy management GUI 400b illustrated in FIG. 4B.

A session owner 205 may add a fully specified constraint to a policy by selecting an "Add Constraint" button 450. Once the constraint has been added, a session owner 205 may continue to specify additional constraints on the GUI 400a via the "constraint" 430 context menu, as just described. As previously discussed, a set of two or more constraints may be linked to form a constraint chain. In embodiments, a constraint chain optionally may be specified on the exemplary GUI 400a by a selection of the logical operator 440 that will link the currently specified constraint with a subsequently specified constraint. Turning to the exemplary GUI 400a, a linking logical operator may be selected by a session owner 205 from choices 445 presented in a list box 402.

Once all of the policy constraints have been specified, a session owner 205 may submit the fully configured "add contact" request 312 via the exemplary GUI by selecting an "OK" button 460.

FIG. 4B depicts an exemplary GUI 400b for managing policies associated with user contacts according to various embodiments of the invention. In embodiments of IM system 100, this GUI may be a tab view selected by a session owner 205.

In embodiments, the stored set of policies 242 associated with a session owner 205 may be displayed in a Policies pane 470 on the exemplary GUI 400b. As summarized in Table 1 and illustrated in FIG. 4B, the stored set of policies 242 may comprise pre-configured system policies, admin-configured system policies, and/or user policies that have been defined and configured by the session owner 205. In various embodiments, the session owner 205 may add 482, delete 486, or edit 484 user policies via the exemplary GUI 400b. In embodiments, each new policy that is created by the session owner 205 may be configured as enabled by default, and the session owner 205 may use the exemplary GUI 400b to change the policy's enablement status either by explicitly editing the policy status or by configuring an auto-disabling feature that includes a specified activity constraint for determining the policy's enablement status. In embodiments, a stored policy may be configured by the session owner 205 to be temporarily cached. For example, if the exemplary policy associated with the constraint "The status of Bug 12345 equals 'Open'" is cached for a period of 6 months from the current date, the policy will be evaluated and potentially associated with retrieved user contacts 232 for 6 months, after which time the policy will be deleted permanently from the stored policies 242 associated with the session owner 205.

As previously described, a policy may comprise two or more constraints that are linked by a logical operator to form a constraint chain. Exemplary selected user policy "U1" 472 is composed of a constraint chain in which "constraint1" and "constraint2" are linked by the logical operator AND. In embodiments, a policy may be associated with a query and/or other features that may be displayed on the exemplary GUI 400b in a Policy Query/Description pane 476 when the policy is selected in the Policies pane 470.

In embodiments, the stored user contacts associated with a session owner 205 may be displayed in a User Contacts pane 480 on the exemplary GUI 400b. In embodiments, the session owner 205 may add 482 or delete 486 user contacts via the GUI 400b. In various embodiments, a stored contact may not be permanently deleted via the GUI 400b if the stored policies associated with the contact are not deleted from the system and are active. In this case, the contact may be re-added to the session owner's 205 generated active contacts list by the IM system if the policy constraints are satisfied. In embodiments, a stored contact may be permanently deleted via the GUI 400b if the contact's associated stored policies also are deleted or if the contact is not associated with any stored policies.

In embodiments, a session owner 205 may edit 484 a contact's association with policies via the GUI 400b. For example, a contact's association with a policy may be explicitly changed, or a contact may be associated with additional policies by being added to one or more contact groups that have been configured to be associated with policies.

C. Method Implementations

The following sections describe embodiments of methods for policy-based management of a user contacts list. The method embodiments may be implemented in embodiments of IM system 100.

1. Methods for Initializing and Maintaining an Active User Contacts List

Figure 5:
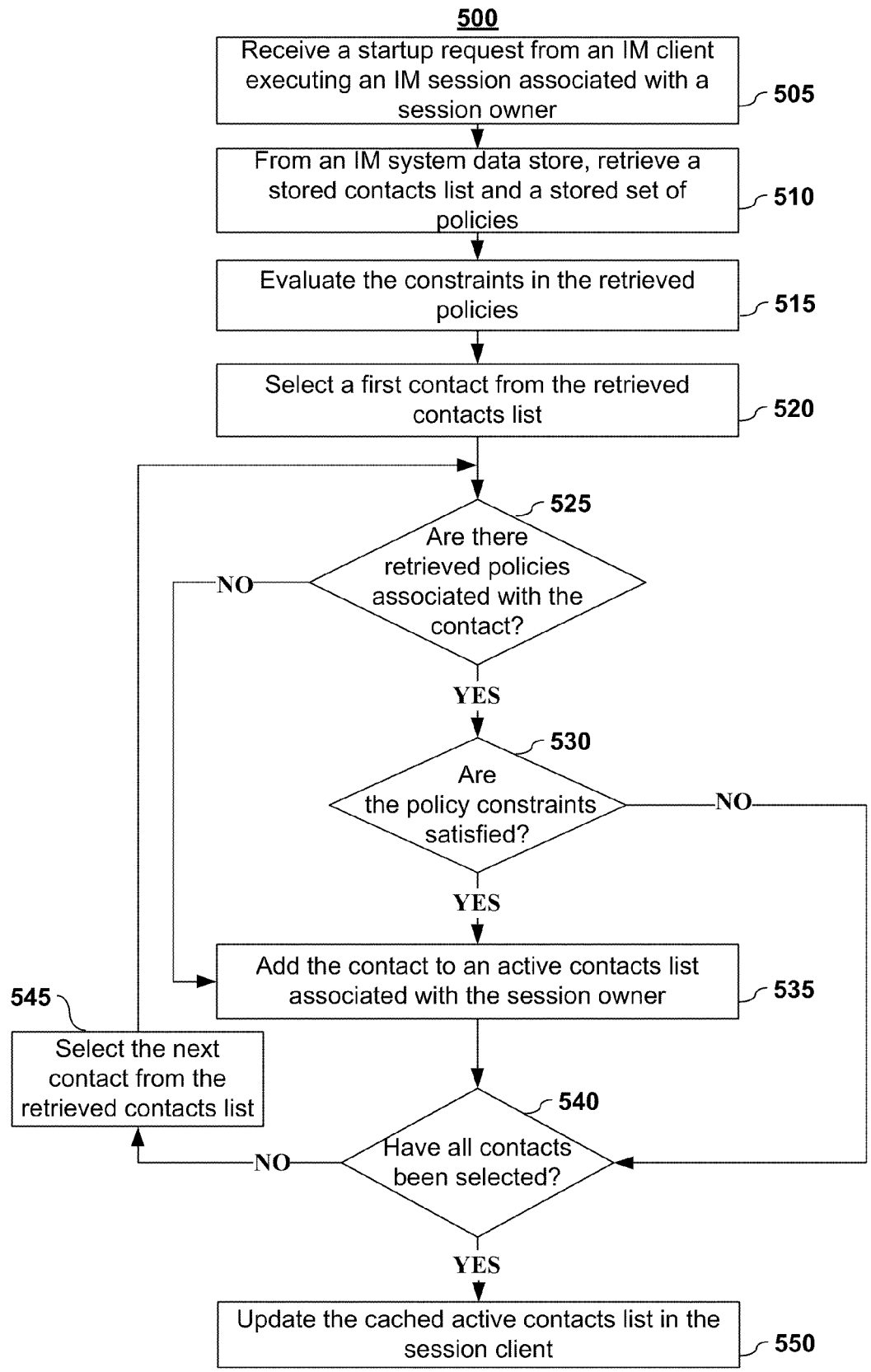
FIG. 5 depicts a first embodiment of a method for initializing an active user contacts list according to various embodiments of the invention.

FIG. 5 depicts a first embodiment of a method 500 for initializing an active user contacts list according to various embodiments of the invention. Method 500 may be implemented by embodiments of IM system 100. An exemplary scenario for initialization of an IM user contacts list in embodiments of IM system 100 is depicted in FIG. 2.

In embodiments, an IM session startup request 214 is received 505 from an IM client 110 that is executing an IM session on behalf of a session owner 205. As previously described, IM system-wide data may be persistently stored, and IM system-wide data may comprise an IM data store 130 and an IM policy store 140. In embodiments, an IM data store 130 may comprise a user repository in which the contacts of all of the IM system users are stored. In embodiments, an IM policy store 140 is a data repository comprising the set of policies used to manage user contacts lists. As previously discussed, in embodiments, exemplary IM system-wide data storage may be implemented as one or more of: a database, an LDAP-based directory server, and a set of flat files.

In embodiments, a stored contacts list associated with the session owner 205 and, if present, a stored set of policies associated with the stored contacts list are retrieved 510 from the system-wide IM persistent data stores. As previously described, a stored set of policies may comprise more than one policy type, as summarized in Table 1. In embodiments, the constraints that are associated with the retrieved policies are evaluated 515. If a first contact selected 520 from the set of retrieved contacts is associated 525 with a subset of the retrieved set of policies and the evaluated constraints associated with the subset of policies are satisfied (i.e., the evaluation result for each of the constraints is the logical value "true") 530, then the first contact is added 535 to an active contact list 218 associated with the session owner 205. However, if not all of the evaluated constraints are satisfied, the first contact is not added to the active contact list 218.

If the first contact is not associated 525 with a subset of the retrieved set of policies, the first contact is added 525 to the active contact list without constraint evaluation. Until 540 all of the contacts in the retrieved contacts list are handled, a next contact is selected 545 from the retrieved contacts list, and the next contact is handled as described for steps 525, 530, and 535. The generated active contacts list 218 is received by the IM client 110, as previously described, and is used to update 550 the cached active contacts list within the client local data store 115.

Figure 6:
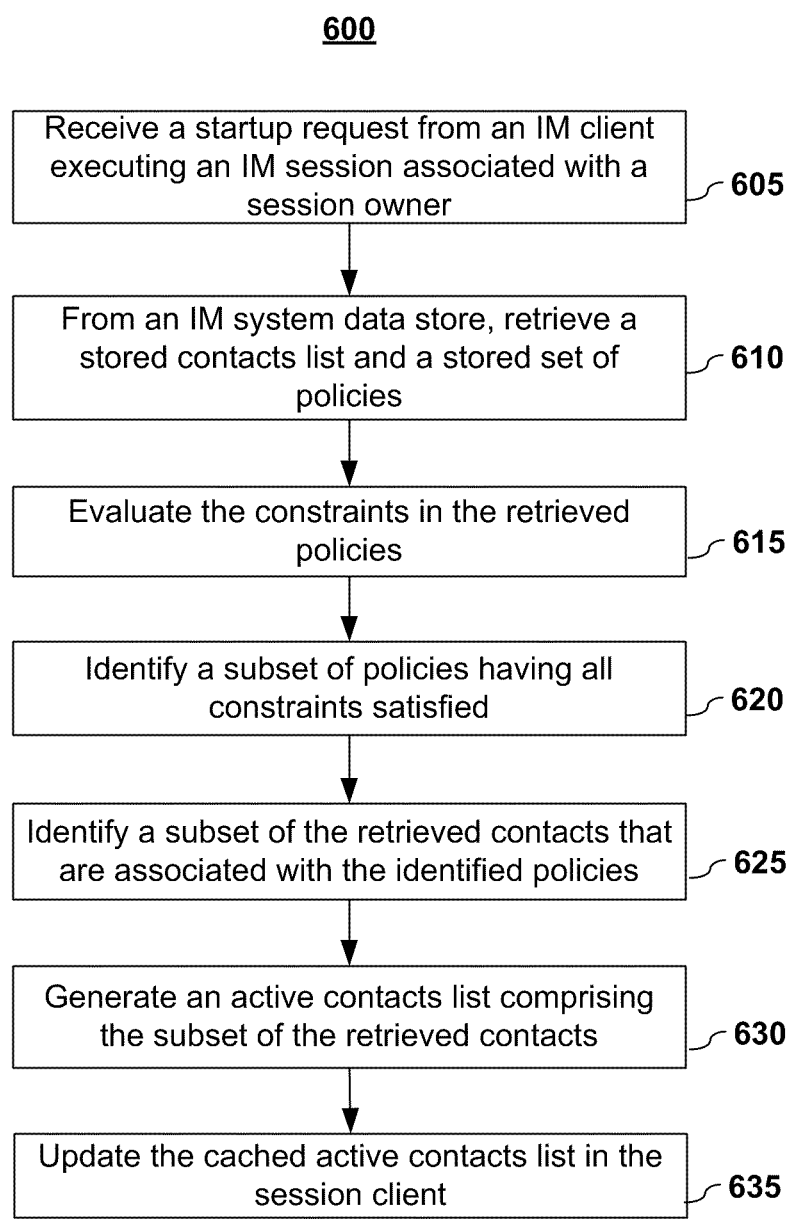
FIG. 6 depicts a second embodiment of a method for initializing an active user contacts list according to various embodiments of the invention.

FIG. 6 depicts a second embodiment of a method 600 for initializing an active user contacts list according to various embodiments of the invention. Method 600 may be implemented by embodiments of IM system 100.

In embodiments, a startup request is received 605 from an IM client, system-wide data are retrieved 610, and the constraints in the retrieved policies are evaluated 615 as described for steps 505, 510, and 515 in method 500.

In embodiments, a subset of policies having all constraints satisfied is identified 620, and a subset of the retrieved contacts that are associated with the identified policies is identified 625. In embodiments, an active contacts list 218 comprising the identified subset of contacts is generated 630 and is used to update 635 the cached active contacts list within the client local data store 115 as described for step 550 in method 500.

a) Constraint Evaluation

Figure 7:
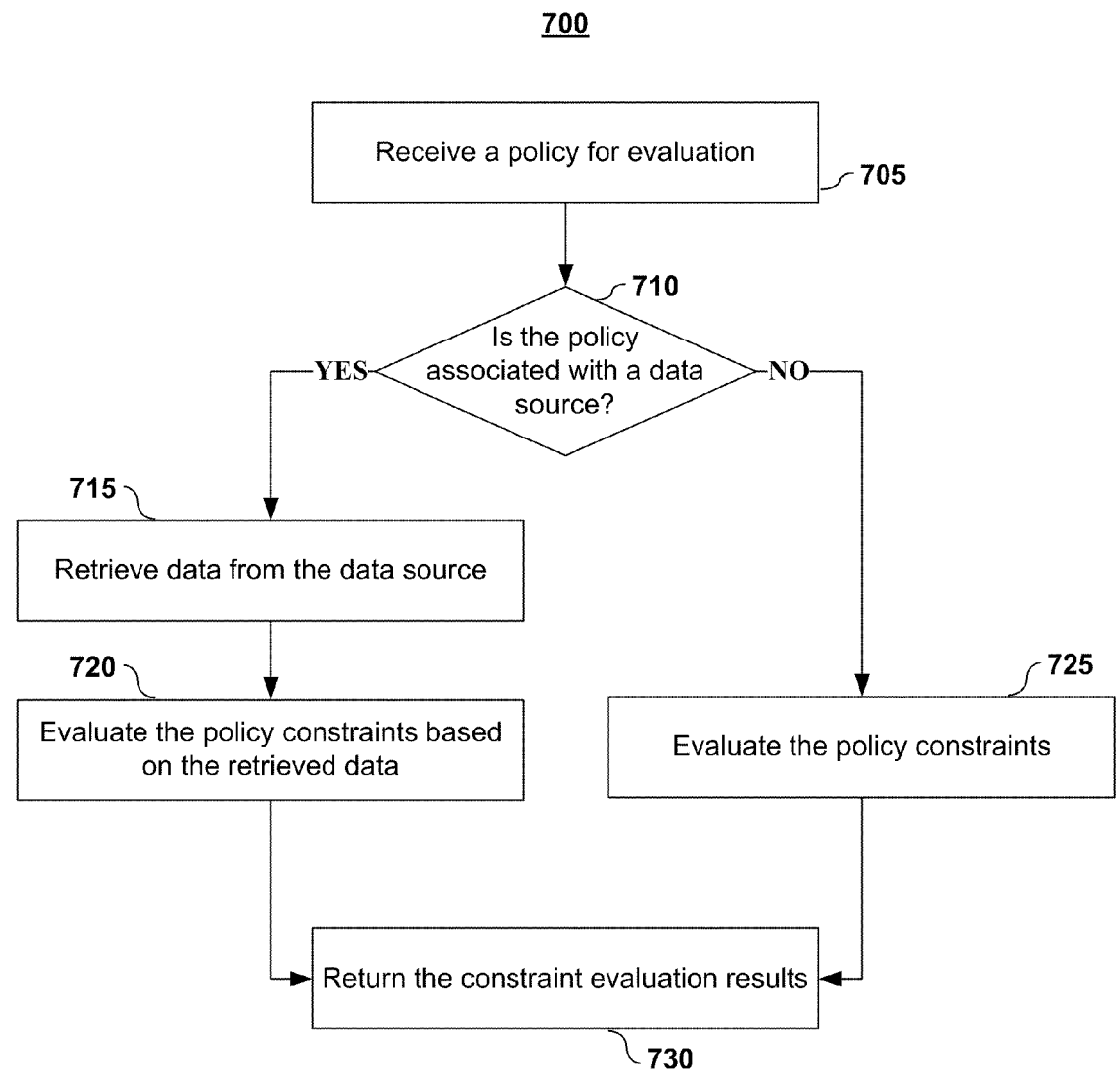
FIG. 7 depicts a method for evaluating a set of constraints associated with a policy according to various embodiments of the invention.

FIG. 7 depicts a method 700 for evaluating a set of constraints associated with a policy according to various embodiments of the invention. Method 700 may be implemented in embodiments of step 515 in method 500 and in embodiments of step 615 in method 600.

In embodiments, if at least one constraint associated with a received policy is associated 710 with one or more data sources 150, evaluation data 252 is retrieved 715 from the data sources. For example, in embodiments, the exemplary defect tracking policy containing the constraint "The status of Bug 12345 equals 'Open'" is associated with a particular bug database, and the status of Bug 12345 (e.g., "Open" or "Resolved") is the evaluation data 252 that would be retrieved from the bug database. The retrieved evaluation data 252 are used to evaluate 720 the constraints associated with the policy. As previously discussed, a policy that is associated with a data source also may be an example of a dynamic policy, for which the evaluation result depends on the current value of the retrieved evaluation data 252. The policy associated with the constraint "The status of Bug 12345 equals 'Open'" is an exemplary dynamic policy, since a bug's status within a defect tracking system is expected to change over time.

If the policy constraints are not associated 710 with a data source, evaluation 725 of the policy constraints does not depend on retrieved external data. For example, a time constraint based on an expiration date such as "Date is before Apr. 30, 2009" does not depend on retrieval of external data. However, it should be noted this exemplary time constraint policy also is an example of a dynamic policy, because the current value of Date is dependent on the time each evaluation request is processed.

As previously described, a subset of policy constraints may comprise one or more constraint chains. In embodiments, the evaluation results of the policy constraints are returned 730.

b) Handling a Polling Request

Figure 8:
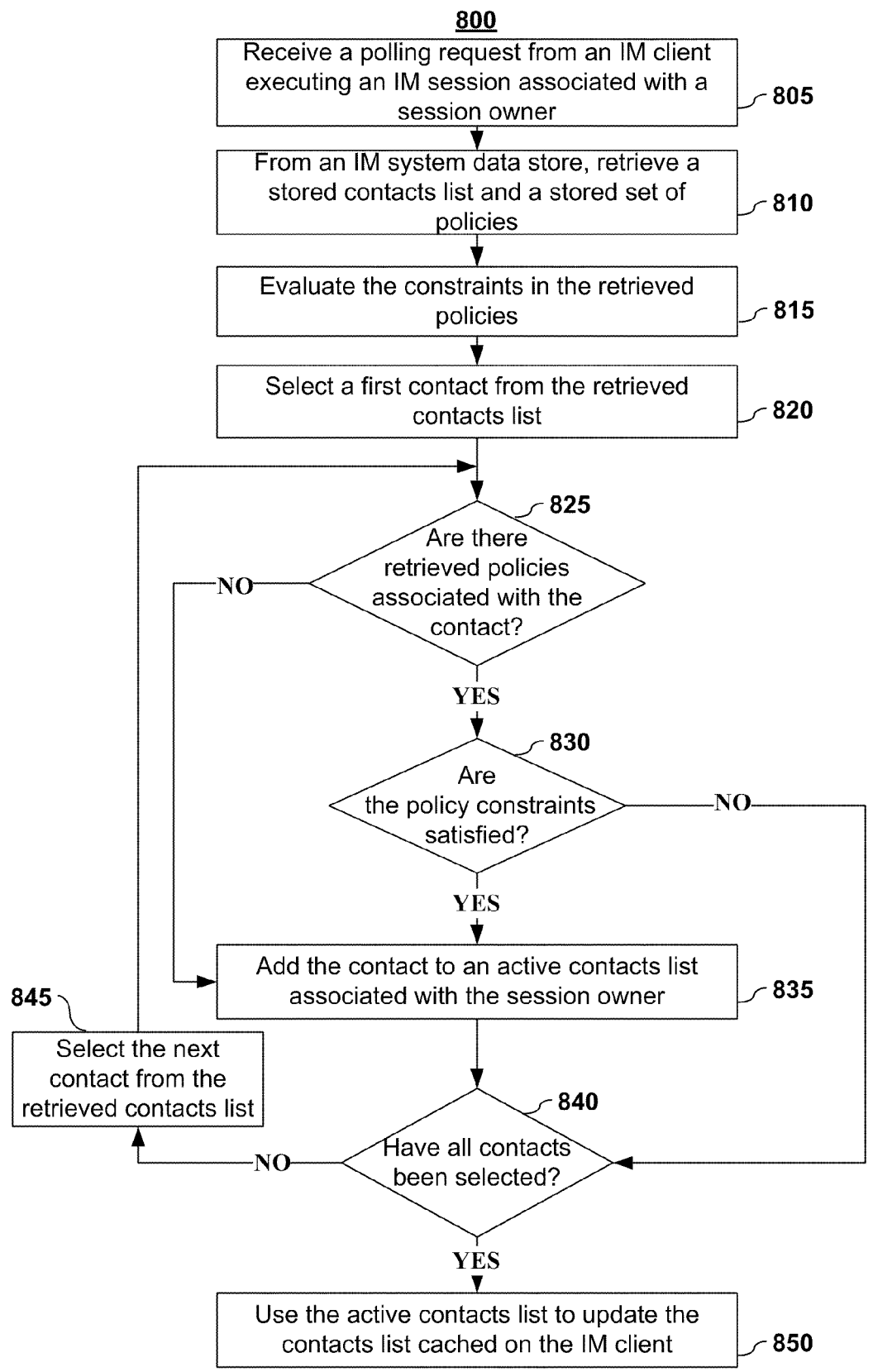
FIG. 8 depicts a method for handling a polling request according to various embodiments of the invention.

FIG. 8 depicts a method 800 for handling a polling request according to various embodiments of the invention. Method 800 may be implemented by embodiments of IM system 100. An exemplary scenario for handling a polling request in embodiments of IM system 100 is depicted in FIG. 2.

As previously discussed, various embodiments of IM client 110 may further comprise a polling agent 215 to facilitate dynamic updating of the cached active contact list in the client local data store 115 during an IM session. In embodiments, polling agent 215 submits a polling request 214 to IM Server 120, which handles the request. In various embodiments of IM client 110, the polling request 214 may be generated and submitted in response to a request submitted to the IM client 110 by the session owner 205, and/or it may be one of a set of polling requests 214 that are generated and submitted by the IM client 110 at regular time intervals during an IM session based on a time interval value that is configurable by the session owner 205.

In embodiments, a polling request 214 is received 805 from an IM client 110 that is executing an IM session on behalf of a session owner 205. In embodiments, steps 810, 815, 820, 825, 830, 835, 840, 845, and 850 handle the polling request by generating an updated active contacts list 218 and updating the contacts list cached on the IM client 110 as described for steps 510, 515, 520, 525, 530, 535, 540, 545, and 550 in method 500.

2. Method for Addition of a Contact to a Contacts List

Figure 9:
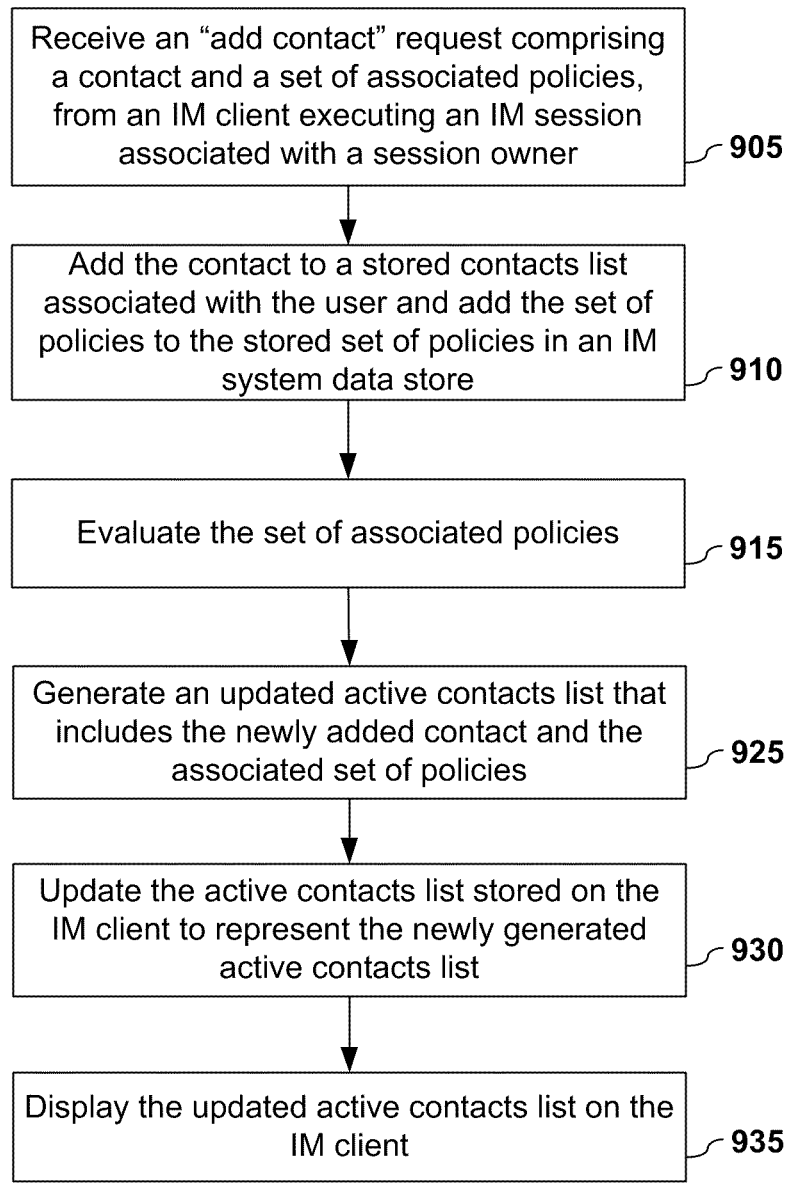
FIG. 9 depicts a method for adding a contact to a contacts list according to various embodiments of the invention.

FIG. 9 depicts a method 900 for adding a contact to a contacts list according to various embodiments of the invention. Method 900 may be implemented by embodiments of IM system 100. An exemplary scenario for addition of a contact to a contacts list in embodiments of IM system 100 is depicted in FIG. 3.

As previously described, in embodiments, a session owner 205 may configure an "add contact" request 312 via a user interface provided by an IM client 110. In embodiments, an IM client 110 may provide a GUI, and a session owner 205 may configure the "add contact" request 312 by entering data via an "add contact" screen (such as the exemplary GUI 400a illustrated in FIG. 4A). In embodiments, an "add contact" request 312 may comprise an identifier of the new contact (contact being added) and a policy to be associated with the new contact. In embodiments, the associated policy may comprise user-defined constraints.

In embodiments, the "add contact" request 312 is received 905 from an IM client 110 that is executing an IM session on behalf of a session owner 205. In embodiments, the system-wide IM persistent data stores are updated 910 by adding the contact specified in the "add contact" request 312 to a stored contacts list associated with the session owner 205, and by adding the set of associated policies specified in the "add contact" request 312 to the stored set of policies associated with the stored contacts, if the set of associated policies contains policies that have not previously been stored.

In embodiments, the updated set of associated policies is evaluated 915 as described for step 515 in method 500. If the policy constraints associated with the newly added contact are satisfied 935, an updated active contacts list 218 that includes the newly added contact is generated 925.

In embodiments, the updated active contacts list 218 is received by the IM client 110, and the active contacts list cached on the IM client 110 is updated 930 as described for step 550 in method 500. The active contacts list display on the IM client 110 is updated to represent the updated active contacts list 218.

D. Computing System Implementations

It shall be noted that the present invention may be implemented in any instruction-execution/computing device or system capable of processing data. The present invention may also be implemented into other computing devices and systems. Furthermore, aspects of the present invention may be implemented in a wide variety of ways including software, hardware, firmware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

Figure 10:
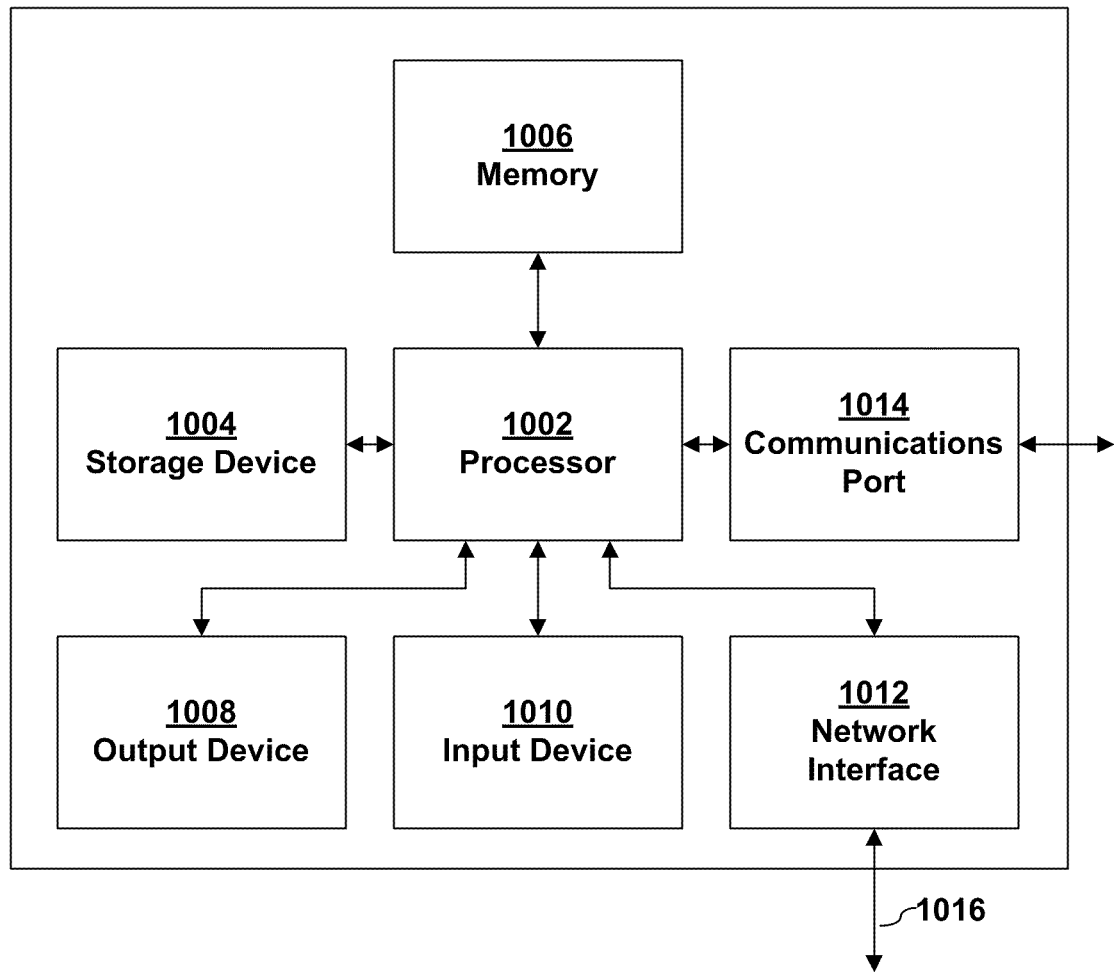
FIG. 10 depicts a block diagram of a computing system according to various embodiments of the invention.

FIG. 10 depicts a functional block diagram of an embodiment of an instruction-execution/computing device 1000 that may implement or embody embodiments of the present invention. As illustrated in FIG. 10, a processor 1002 executes software instructions and interacts with other system components. In an embodiment, processor 1002 may be a general purpose processor such as (by way of example and not limitation) an AMD processor, an INTEL processor, a SUN MICROSYSTEMS processor, or a POWERPC compatible-CPU, or the processor may be an application specific processor or processors. A storage device 1004, coupled to processor 1002, provides long-term storage of data and software programs. Storage device 1004 may be a hard disk drive and/or another device capable of storing data, such as a magnetic or optical media (e.g., diskettes, tapes, compact disk, DVD, and the like) drive or a solid-state memory device. Storage device 1004 may hold programs, instructions, and/or data for use with processor 1002. In an embodiment, programs or instructions stored on or loaded from storage device 1004 may be loaded into memory 1006 and executed by processor 1002. In an embodiment, storage device 1004 holds programs or instructions for implementing an operating system on processor 1002. In one embodiment, possible operating systems include, but are not limited to, UNIX, AIX, LINUX, Microsoft Windows, and the Apple MAC OS. In embodiments, the operating system executes on, and controls the operation of, the computing system 1000.

An addressable memory 1006, coupled to processor 1002, may be used to store data and software instructions to be executed by processor 1002. Memory 1006 may be, for example, firmware, read only memory (ROM), flash memory, non-volatile random access memory (NVRAM), random access memory (RAM), or any combination thereof. In one embodiment, memory 1006 stores a number of software objects, otherwise known as services, utilities, components, or modules. One skilled in the art will also recognize that storage 1004 and memory 1006 may be the same items and function in both capacities. In an embodiment, one or more of the components of FIGS. 1-3 may be modules stored in memory 1004, 1006 and executed by processor 1002.

In an embodiment, computing system 1000 provides the ability to communicate with other devices, other networks, or both. Computing system 1000 may include one or more network interfaces or adapters 1012, 1014 to communicatively couple computing system 1000 to other networks and devices. For example, computing system 1000 may include a network interface 1012, a communications port 1014, or both, each of which are communicatively coupled to processor 1002, and which may be used to couple computing system 1000 to other computer systems, networks, and devices.

In an embodiment, computing system 1000 may include one or more output devices 1008, coupled to processor 1002, to facilitate displaying graphics and text. Output devices 1008 may include, but are not limited to, a display, LCD screen, CRT monitor, printer, touch screen, or other device for displaying information. Computing system 1000 may also include a graphics adapter (not shown) to assist in displaying information or images on output device 1008.

One or more input devices 1010, coupled to processor 1002, may be used to facilitate user input. Input device 1010 may include, but are not limited to, a pointing device, such as a mouse, trackball, or touchpad, and may also include a keyboard or keypad to input data or instructions into computing system 1000.

In an embodiment, computing system 1000 may receive input, whether through communications port 1014, network interface 1012, stored data in memory 1004/1006, or through an input device 1010, from a scanner, copier, facsimile machine, or other computing device.

One skilled in the art will recognize no computing system is critical to the practice of the present invention. One skilled in the art will also recognize that a number of the elements described above may be physically and/or functionally separated into sub-modules or combined together.

It shall be noted that embodiments of the present invention may further relate to computer products with a computer-readable medium that have computer code thereon for performing various computer-implemented operations. The media and computer code may be those specially designed and constructed for the purposes of the present invention, or they may be of the kind known or available to those having skill in the relevant arts. Examples of computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a computer. Examples of program modules include libraries, programs, routines, objects, components, and data structures. In distributed computing environments, program modules may be physically located in settings that are local, remote, or both.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

What is claimed is:

1. A system for managing an active user contacts list for a user of an electronic communication application, the system comprising:
    a user contact data store that stores a plurality of user contacts;
    a policy data store that stores one or more policies for each user contact stored in the user contact data store;
    a data source that includes evaluation data for use in evaluating the policies in the policy data store, wherein the evaluation data is periodically updated;
    a messaging server, operating on a computer including one or more microprocessors, that includes an active contacts list generator coupled to the user contact data store and the policy data store, for generating an active user contacts list in response to a session initialization request from a session owner using a messaging client, wherein each user contact on the active users contact list satisfies the one or more policies associated with that user contact based on the evaluation data;
    wherein the active contacts list generator operates to update, during a communication session established by the session initialization request, the active user contacts list in response to a change in the evaluation data;
    wherein the evaluation data change is detected via a polling request received from the messaging client at a configurable interval, and results in a change for a particular user contact in the user contact data store in satisfying a particular policy stored in the policy data store.

2. The system of claim 1, wherein the one or more policies for each user contact stored in the user contact data store are configurable.

3. The system of claim 1 wherein the active contacts list generator comprises:
    a policy evaluator that evaluates the one or more policies associated with each user contact.

4. The system of claim 3 wherein the policy is associated with a set of logical constraints.

5. The system of claim 1 wherein the messaging client operates on a second computer system and includes a user interface that receives input from the session owner and displays session information data to the session owner.

6. The system of claim 5 wherein the messaging client receives the active user contacts lists and caches the received active user contact list.

7. The system of claim 5, wherein the messaging client further comprises a client local data store that stores the session information data comprising the active user contacts list and displayed to the session owner.

8. The system of claim 5 wherein the user interface provides a visual display of the active user contacts list.

9. A non-transitory computer readable storage medium storing a set of instructions executable by one or more processors to perform a method comprising:
    configuring a user contact data store that stores a plurality of user contacts, and a policy data store that stores one or more policies for each user contact stored in the user contact data store;
    configuring a data source that includes evaluation data for use in evaluating the policies in the policy data store, wherein the evaluation data is periodically updated;
    receiving, via a messaging server executing on a machine including one or more microprocessors, a request for initializing a communication session associated with a session owner from a messaging client, wherein the message server is coupled to the user contact data store and the policy data store;
    generating, in response to the session initialization request, an active user contacts list, wherein each user contact on the active users contact list satisfies the one or more policies associated with that user contact based on the evaluation data;
    updating, during the communication session and via the active contacts list generator the active user contacts list in response to a change in the evaluation data;
    wherein the evaluation data change is detected via a polling request received from the messaging client at a configurable interval, and results in a change for a particular user contact in the user contact data store in satisfying a particular policy stored in the policy data store.

10. The non-transitory computer readable storage medium of claim 9, wherein the one or more policies associated with each user contact stored in the user contact data store are configurable.

11. The non-transitory computer readable storage medium of claim 9, wherein the messaging client operates on a second computer system and includes a user interface that receives input from the session owner and displays session information data to the session owner.

12. The non-transitory computer readable storage medium of claim 11, wherein the messaging client receives the active user contacts lists and caches the received active user contact list.

13. The non-transitory computer readable storage medium of claim 9, wherein the active contacts list generator comprises:
   a policy evaluator that evaluates the one or more policies associated with each user contact.

14. The non-transitory computer readable storage medium of claim 9, wherein the messaging client further comprises a client local data store that stores the session information data comprising the active user contacts list and displayed to the session owner.

15. The non-transitory computer readable storage medium of claim 9, wherein the user interface provides a visual display of the active user contacts list.

16. A method for managing an active user contacts list for a user of an electronic communication system, the method comprising:
   configuring a user contact data store that stores a plurality of user contacts, and a policy data store that stores one or more policies for each user contact stored in the user contact data store;
   configuring a data source that includes evaluation data for use in evaluating the policies in the policy data store, wherein the evaluation data is periodically updated;
   receiving, via a messaging server executing on a machine including one or more microprocessors, a request for initializing a communication session associated with a session owner from a messaging client, wherein the message server is coupled to the user contact data store and the policy data store;
   generating, in response to the session initialization request, an active user contacts list, wherein each user contact on the active users contact list satisfies the one or more policies associated with that user contact based on the evaluation data;
   updating, during the communication session and via the active contacts list generator the active user contacts list in response to a change in the evaluation data;
   wherein the evaluation data change is detected via a polling request received from the messaging client at a configurable interval, and results in a change for a particular user contact in the user contact data store in satisfying a particular policy stored in the policy data store.

17. The method of claim 16, wherein the one or more policies associated with each user contact stored in the user contact data store are configurable.

18. The method of claim 16, wherein the messaging client operates on a second computer system and includes a user interface that receives input from the session owner and displays session information data to the session owner.

19. The method of 18, wherein the messaging client receives the active user contacts lists and caches the received active user contact list.

20. The method of 16, wherein the user interface provides a visual display of the active user contacts list.

* * * * *